March 23, 1965 H. A. MAUCH 3,175,038

SCANNING AND TRANSLATING APPARATUS

Filed June 29, 1960 2 Sheets-Sheet 1

INVENTOR.
HANS A. MAUCH
BY
Jerome P. Bloom
HIS ATTORNEY

INVENTOR.
HANS A. MAUCH
BY Jerome P. Bloom
HIS ATTORNEY

United States Patent Office 3,175,038 Patented Mar. 23, 1965

3,175,038
SCANNING AND TRANSLATING APPARATUS

Hans A. Mauch, 4418 Airway Road, Dayton, Ohio

Filed June 29, 1960, Ser. No. 39,653
7 Claims. (Cl. 179—1)

Figure 1:
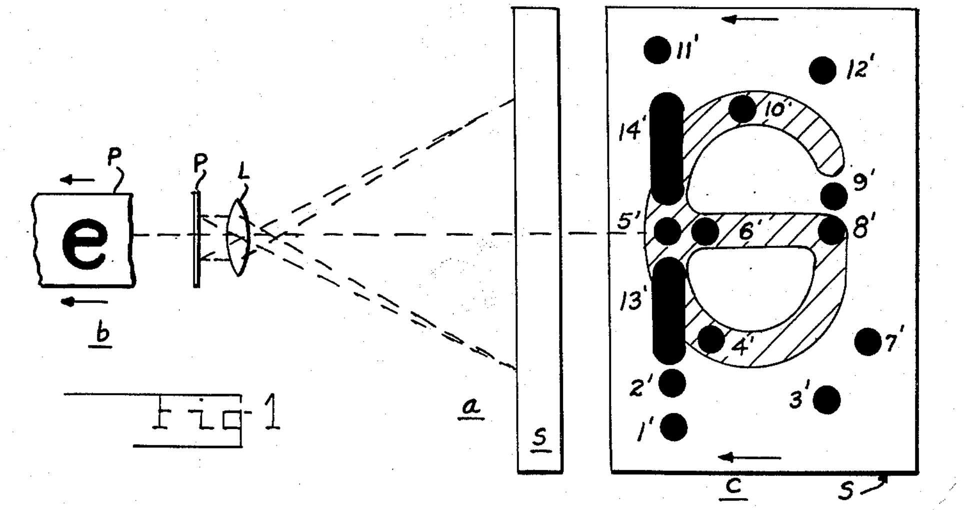

This invention relates to a system and apparatus for scanning and translating objects scanned into signals based on an instantaneous two dimensional sensing thereof and transmitting the signals in a form which identifies the object scanned. A preferred embodiment provides a novel reading machine capable of sensing print, indicia, impressions, graphic representations and the like and transmitting representative signals which are translated in an audible form.

For the purposes of illustration the invention will be described herein with reference to its application in a reading machine. However, this is not to be construed as intended in any way to limit the form or application of the invention system or its components. It should be readily apparent therefrom to those versed in the arts that the invention system and its components have other mutual and independent applications within the scope of the present invention Difficulties have been encountered in efforts to produce an efficient reading machine. Machines previously developed have been complex, expensive, and their outputs have been relatively unintelligible, so much so that it has been necessary to extensively train and condition their operators to recognize the sounds or signals produced thereby. Further, the reading speed enabled thereby is not adequate. As a result, the prior art reading machine is limited in application and impractical for general use.

The present invention particularly overcomes the major problems confronting the reading machine art. It provides a simple reading machine capable of sensing print, indicia, impresisons, graphic representations and the like and accurately translating them into intelligible sound. The efficiency of the machine is enhanced by a novel scanner unit which transmits signals of the object scanned based on an instantaneous two dimensional sensing thereof. The translator or reproduction portion of the machine is equally novel in that it is capable of simply reproducing and even synthesizing signals received thereby in a manner to make its output readily intelliglble to any operator.

A primary object of the invention is to provide improved sensing and translating systems and components thereof which are economical to fabricate, more efficient and satisfactory in use, adaptable to a wide variety of applications and require a minimum of maintenance.

Another object of the invention is to provide apparatus for scanning indicia, print, impressions, graphic representation and the like which converts them into signals based on an instanteous two dimensional sensing thereof.

A further object of the invention is to provide an improved sensing and translating system wherein means are provided for sensing an object based on an aspect thereof which is two dimensional in character and translating it into an identifying signal.

An additional object of the invention is to provide a novel signal transmitting unit.

A further object of the invention is to provide a novel signal transmitting unit having stored data selectively responsive to transmit such data on receipt of signals corresponding thereto.

Another object of the invention is to provide a novel signal transmitting unit capable of synthesizing signals received thereby.

An additional object of the invention is to provide an improved reading machine capable of sensing indicia, print, impressions, graphic representations and the like and reproducing them in audible intelligible form which in a preferred embodiment includes means to synthesize the audible reproductions thereof.

Another object of the invention is to provide scanning and translating apparatus possessing the advantageous structural features, the inherent meritorious characteristics and the means and mode of operations herein described.

With the above primary and other objects in view which more fully appear in the specification, the invention intended to be protected by Letters Patent consists of the features of construction, the parts and combinations thereof and the mode of operation hereinafter described or illustrated in the accompanying drawings, or their equivalents.

Figure 2:
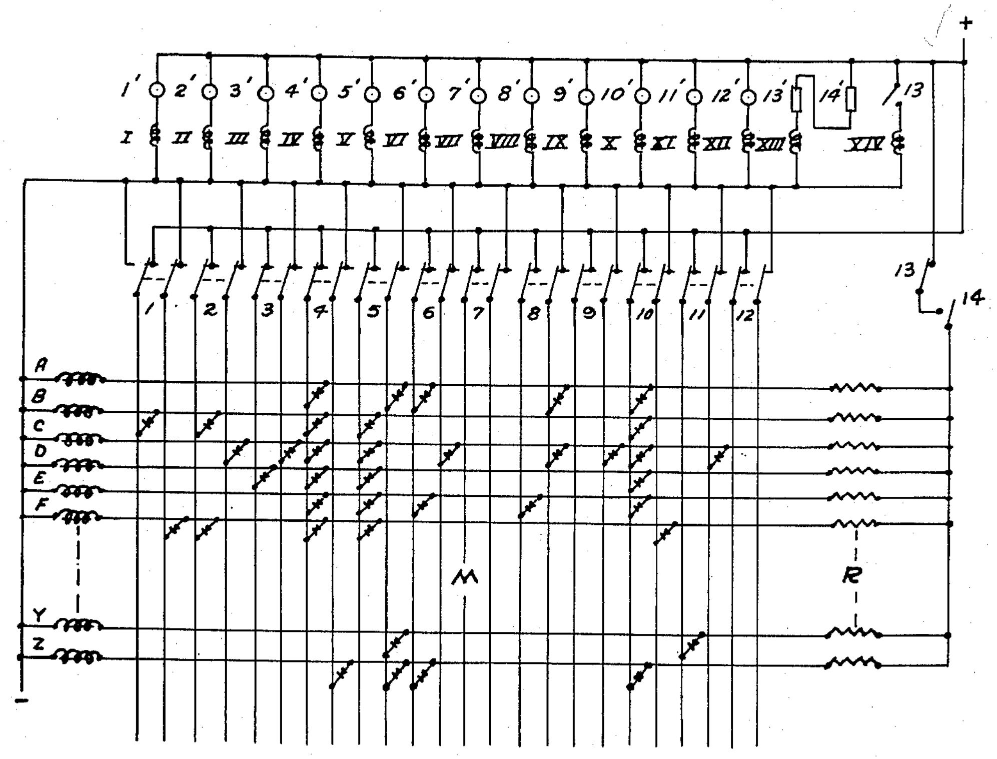
Figure 3:
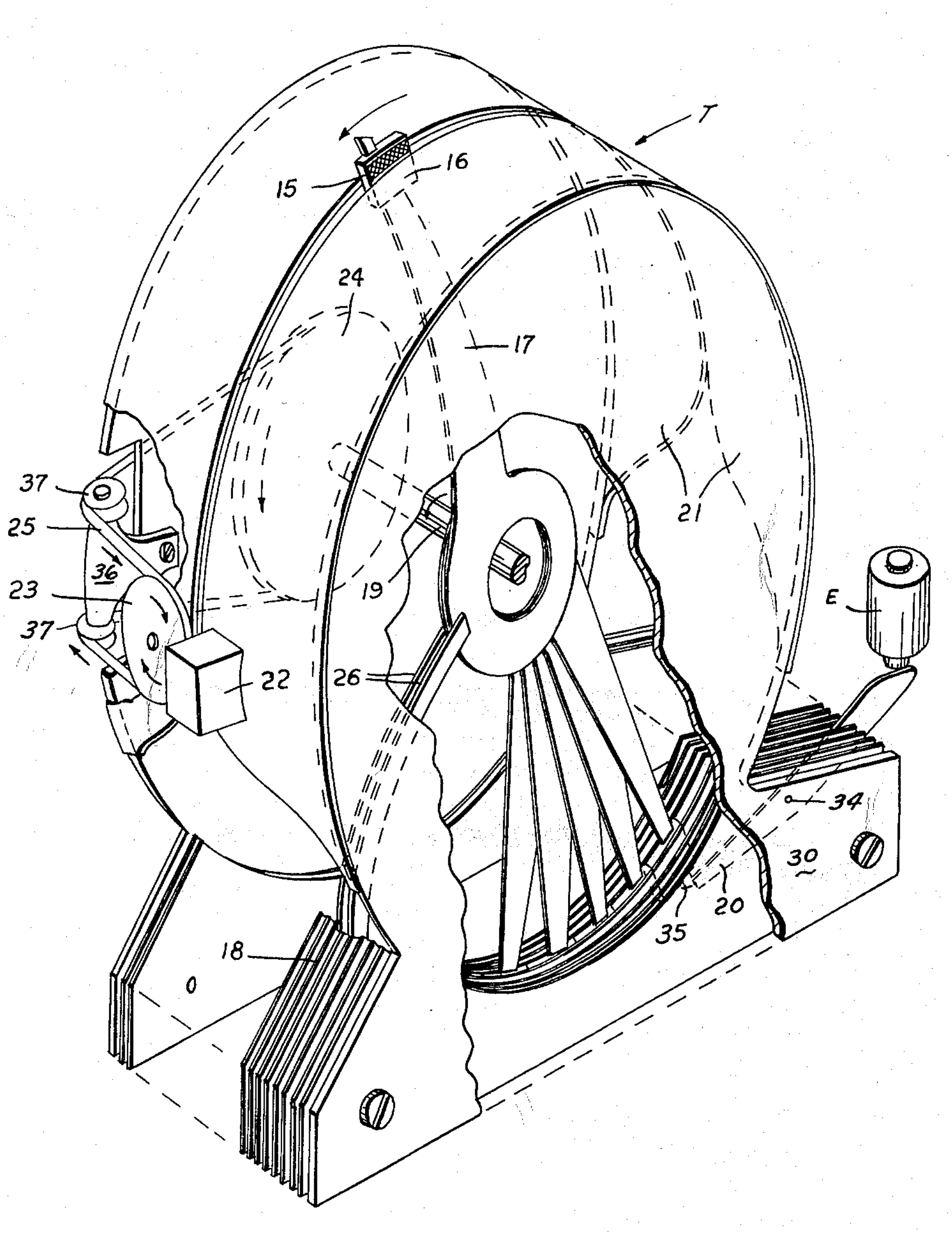

Referring to the drawings, wherein a preferred but not necessarily the only form of embodiment or application of the invention or its components is shown, FIG. 1 is a schematic view of essentials of a scanner unit employed in a reading machine in accordance with the invention, a lens, screen and object scanned being indicated in 1*a*; the object being scanned in 1*b*, and the screen in 1*c*;

FIG. 2 is a schematic of an electrical circuit which is operatively related to the screen of FIG. 1; and FIG. 3 is a perspective view of the transmitter of the reading machine, shown partly in section and with portions omitted to the extent necessary for clarity of disclosure.

The invention can be best described with reference to the embodiment shown in the drawings. It includes scanner and transmitter units each of which is novel unto itself and capable of independent use, however, here they functionally relate to produce highly effective results.

The scanner is illustrated in FIG. 1 of the drawings in process of sensing a line of print on a tape or other printed publication. Guided relative motion of the tape and scanner is necessary to enable a reading of the print in its proper sequence. This may be accomplished by any suitable means and may provide either for movement of the tape or the scanner per se. In either event the scanner includes a lens L which scans the print in passing and projects an inverted image thereof which moves over a screen S. Necessary illumination of the print may be provided to the front or back thereof and may be effected in any conventional manner.

Imbedded in the screen S in a particular spaced relation over its surface are a series of fourteen photocells, respectively identified by the numbers 1′ to 14′. The cells are of the photo-conductive type such as those commercially available which are made of cadmium selenide. Their electrical resistance is quite low when sensing light and becomes quite high if they sense black. In the example illustrated the cells 1′ through 12′ are arranged in a particular pattern which results in a different combination of non-conductive versus conductive cells identifying each letter of the alphabet. For example, it may be seen with reference to FIG. 1 of the drawings that a particular critical orientation of the image of the letter "e" on the screen S would result in the cells 4′, 5′, 6′, 8′ and 10′ sensing the black print of the letter. This fact is used to recognize the letter "e" in accordance with the invention. At this point these cells would have a high resistance while the remaining cells of the group 1′ through 12′ would have a low resistance since they are sensing light. The cells 13′ and 14′ which are vertically elongated have a different purpose than the cells 1′ through 12′. These cells are oriented to sense the beginning of a letter image by having a predetermined portion of their vertical extent intercepted by the black of the letter image as it moves across the screen S. They are used to determine the precise point at which a letter is read by the scanner in a manner to be described.

The cells 1′ to 14′ are operatively oriented in the diode matrix shown in FIG. 2 of the drawings. For purposes of explaining the function of these elements in effecting a novel scanner, we will consider what occurs by way of example when there is relative movement between the scanner and print and the letter "e" illustrated in FIG. 1 commences to appear before the lens L.

As the letter "e" is relatively moved with respect to the lens L, its inverted image similarly moves across the screen S. The resistance of the photocells fluctuates as they sense the black of the print from the moving image. These fluctuations have no effect and are neglected until a certain position of the image relative the cells 13′ and 14′ is reached. When the beginning of the inverted image of the letter "e" is sensed by the cells 13′ and 14′, due to the orientation of the cells 1′ through 12′ the image of the letter is so positioned on the screen that the cells 4′, 5′, 6′, 8′ and 10′ are sensing black on a two dimensional basis. This is the critical, optimum viewing position of the selected image relative the cells 1′ through 14′ and may be considered its "snap shot" position.

From FIG. 2 of the drawings we are able to observe what occurs in the diode matrix M in which the cells are incorporated. Only so much of the matrix is shown as is necessary to explain the operation thereof. Note that the relays in the circuit are designated by roman numerals or capital letters and the contacts operated by the respective relays are designated by corresponding arabic numerals or small letters, as the case may be. Also all contacts are shown in positions corresponding to the unenergized condition of their respective relays. Resistors R are employed in the matrix to limit current in the event the relays A through Z are by-passed by the diode matrix. It should be understood that each of the latter relays are identified to selectively correspond to the various letters of the alphabet.

In the circuit shown cells 1′ through 12′ respectively energize relays I through XII whenever they sense white and de-energize them when they sense black. It will be obvious that as a letter image falls on the cells as it moves across the screen, only certain cells will sense black. In the example illustrated, when the image of the "e" is critically positioned on the screen S, cells 4′, 5′, 6′, 8′ and 10′ sense black as the cells 13′ and 14′ are intercepted by a significant portion of the moving image. This provides that relays IV, V, VI, VIII and X are de-energized and their contacts 4, 5, 6, 8 and 10 are positioned as illustrated in the drawings. The remainder of the relay group I through XII which sense white at this time are energized and their corresponding contacts 1–3, 7, 9, 11 and 12 assume their active positions. The result of this is that all of the relays A through Z except E are by-passed by the diode matrix.

The photocells 13′ and 14′ are connected in series to operate relay XIII which in turn, through a contact 13, operates the relay XIV. Further contacts 13 and 14 are connected in the supply line to control the supply of current through the resistors R and matrix M to relays A through Z. While the relays 13′ and 14′ are sensing white as an image moves onto and over the screen S, relay XIII is energized to open the contact 13 in the supply line to resistors R and close the other contact 13 to energize the relay XIV which pulls in and closes its contact 14. This has no effect since contact 13 in the supply line is open. However, when as shown in FIG. 1c of the drawings cells 13′ and/or 14′ are intercepted or covered by a sufficient portion of the image of the letter "e," relay XIII de-energizes closing the supply line to the resistors R for a short instant. Then relay XIV also drops out interrupting the supply line again. In accordance with the invention at this short instant the letter "e" image simultaneously covers cells 4′, 5′, 6′, 8′ and 10′. Thus, there is a two dimensional sensing of the letter which provides distinction thereof as the relays 13′ and 14′ trigger the circuit to recognize the letter "e" by closing the supply line. Since the relay E is the only one not by-passed, it will pull in for the instant the line contacts 13 are closed to establish the fact the letter "e" has been recognized and transmit a signal corresponding thereto, in this instance to a transmitter T.

Similar procedure is followed with respect to each letter scanned by the lens L. The only difference is that when the cells 13′ and/or 14′ sense the beginning of a different letter image as it moves over the screen S, a different group of the cells 1′ through 12′ will be covered by and sensing the black of the letter image at that instant. Thus, there is an instantaneous two dimensional recognition of each letter which triggers the electrical circuit to send a specific signal.

It will be obvious additional cells may be similarly included to recognize punctuation and other indicia. In a preferred embodiment a diagonally running photocell could be added to sense the spaces between two words or sentences. This can be used either to send a signal of an audible nature or start or stop the readout process as later to be described. This latter cell would be most effective if included with the cells 13′ and 14′ on a recognition screen separate from that mounting cells 1′ through 12′. This, of course, will require a multi-screen system of a nature to be described further herein.

Noting FIG. 3 of the drawings, the transmitter T includes generally circular side plates 30 in spaced parallel relation which have expanded base portions coplanar therewith. Equidistantly spaced intermediately of plates 30 and in parallel relation thereto are a series of plates 18. The plates 18 in conjunction with the plates 30 define successively adjacent vertical storage sections therebetween equal in number to the number of various signals which could be transmitted from the scanner. The storage sections are open to either end. The plates 18 are relatively shallow and have laterally aligned concavities provided centrally of their upper edges. These concavities are defined by identical arcs the radius of which is determined by the longitudinal axis of a shaft 19 which extends between the centers of the circular portions of the plates 30 and bears therein.

Generally semi-cylindrical guide plates 21 are fixed to the respective upper peripheral portions of end plates 30 to project towards each other in aligned relation and dispose their projected edges in closely spaced relation. The adjacent edges of plates 21 are generally parallel except for their respective ends where they curve away from each other to the respective side plates 30 at points adjacent their expanded base portions.

Stored in each of the storage sections intermediate the plates 30 are a series of circularly spaced arcuate segments 16 of non-magnetic material. Within each storage section each segment mounts an arcuate magnetic tape 15 to one side which has an identical word fragment recorded thereon. The lengths of the tapes 15 in each storage section will be dependent on the time interval it would take to reproduce the word fragments thereon in sound.

In the case illustrated in the drawings, the segments shown each have the sound of the letter "e" recorded on the tapes attached thereto. Each segment 16 forms the end of a flexible arm 17. Here five segments are shown stored in the "e" storage section and their arms 17 extend upwardly therefrom to commonly pivot on the shaft 19 by means of annular root portions positioned in immediately adjacent relation. Multiple disc clutches (not shown) are employed to support the root portions of the arms 17 on the shaft 19 in the well known manner which may impart individually on each arm a frictional driving torque. Latch arms 20 are pivoted on a pin 34 in each storage section in the path of rotation of the arms 17 normally positioned by solenoids to engage latch lugs 35 on segments 16 adjacent thereto and prevent rotation of the arms 17. In the example of FIG. 3 of the drawings, the latch arm 20 is under control of a solenoid E which operatively connects to the relay E in the matrix M. The solenoid E trips the latch 20 to release an arm 17 only on occurrence of the short pulse which signals recognition of the letter "e" by the matrix M. This pulse is only sufficient to release a single arm. On its completion the latch arm 20 is pivoted back to engage the latch lug 35 of the following arm.

The storage section plates each mount, co-planar therewith, arcuate guide bars 26 to their ends remote from the latch bars 20. The bars 26 extend upwardly from their respective plates 18 in parallel relation to curve to and laterally contain the root portions of the arms 17 and space them according to the word fragments which they carry.

A projected extremity of the shaft 19 has a pulley 24 fixed thereto. A second smaller pulley 23 is fixed outwardly on one guide plate 21 at the relatively divergent exit portion thereof to rotate in a plane at right angles to the plane of the pulley 24. A bracket 36 fixed to a peripheral edge of the plate 30 adjacent pulley 24 rotatably mounts parallel guide pulleys 37. A pulley belt 25 connects the pulleys 23 and 24, passing over the pulleys 37 therebetween which produce a right angle turn A readout head 22 is fixed on the outer surface of the other guide plate 21 opposite the pulley 23 so as to define therein to the respective planes of the pulleys 23 and 24. a narrow path between the belt 25 and the head 22 which is slightly narrower than the width of the segments 16. In this instance the belt 25 is round in cross section.

Shaft 19 is driven by a suitable motor (not shown).

The speed of the pulley 24 in a peripheral sense is less than one half the peripheral speed of the segments 16 mounting the magnetic tapes. Therefore, since the speed of the belt 25 equals the peripheral speed of the pulley 24, in the event a segment is rotated and engaged by the belt 25 at the head 22 the speed of the segment at the head will be slowed down to less than one half of that prior thereto.

Having described the transmitter T, let us now return to the operation of the invention apparatus as a whole. As previously indicated, when the matrix signals recognition of the letter "e" as the relay E pulls in for a short instant, the corresponding solenoid E is actuated to have the proper latch arm 20 release a single arm 17 having the sound of the "e" recorded on a tape thereon. This enables the shaft 19 to rotate the arm 17 out of its storage section. As the arm moves out of the space between plates 18, it is caught and guided on the curved surface provided on one of the adjacent edges of the guide plates 21. In this manner the arm 17 is guided in to the center of the transmitter unit and into and through the slot provided by the adjacent edges of the guide plates 21 at a uniform speed until it reaches the readout head. Here the segment portion thereof is caught by the outer surface of the belt 25 and driven between it and the readout head at the relatively reduced speed previously mentioned. As this occurs, the tape 15 is presented to the head 22 which audibly and distinctly reproduces the pre-recorded sound of the "e" which was signalled from the scanner. As the segment is released from the head, it picks up speed and is guided to its proper storage section between guides 26.

As each printed letter is scanned by the scanner, recognized by the cells 1′ through 12′ by a two dimensional sensing thereof, and the appropriate signal triggered by the cells 13′ and/or 14′, the transmitter similarly responds to release the appropriate tape from storage for sounding at the head 22. All the letters of a single word will of course be scanned and signalled by the scanner at generally uniform intervals and the corresponding tapes will be released from storage at the same intervals for sounding. By providing the delay of the segments 16 as they pass the head 22, the fragments of the single word subsequent to the first will catch up with the first at the head. In this way the fragments of the word are synthesized and the audible reproduction thereof becomes a continuous sequence. This greatly facilitates word recognition in the use of the machine in accordance with the invention.

The feature of reducing the speed of segments 16 at the head 22 also has the obvious advantage that the successive tapes released from storage can accumulate adjacent the head and there will be a generally uniform continuous reproduction of the recorded fragments relatively uncontrolled by the speed at which the scanner is operated.

In the preferred embodiment of the reading machine, as previously noted, a diagonally running photocell would sense spaces between the words and sentences scanned and send distinguishing signals to the transmitter T. In such instance, as is obvious, a series of arms 17 are provided which mount segments 16 in a storage section of the transmitter having tapes 15 on which are recorded sounds such as a 1,000 c.p.s. "beep" indicative of sensed spaces. These arms 17 will be released in the obvious manner to clearly define between the words and sentences reproduced at the head 22.

In another version of the invention, one could disconnect the pulley 24 from the shaft 19 and provide a normally de-energized magnetic clutch between the two. This would permit a complete word to be assembled in front of the readout head 22 before the readout process starts. The signal for the readout of the word to be commenced could be provided in accordance with this version of the invention by the diagonal photocell described above. As the photocell senses a space as large as that occurring between words, it provides a signal which releases a special arm in the transmitter and also energizes the magnetic clutch to provide a drive of pulley 24 by the shaft 19 and a corresponding movement of the assembled segments 16 past the readout head 22 under the influence of belt 25. The clutch is maintained in its energized condition by conventional means until the special arm passes the readout head 22 following the readout of the previously assembled word and operates to de-energize the clutch.

The principle shown in FIG. 1 is not restricted to small letters. It can as well be used for recognizing capital letters, numerals and other characters such as punctuations. In such applications, however, it would be advantageous to display the printed characters on several screens at the same time which can be accomplished in a well-known way by using arrangements of semi-transparent mirrors or the like. One screen in such a case could then be equipped with photocells in an arrangement which would only be used for answering the question into which of the four categories—small letters, capital letters, numerals, punctuations—the displayed character belongs. The remaining screens would then be equipped with arrangements of photocells particularly suited for recognizing the character in each given category. The first screen that determines the category would then be used to energize only the one screen of the remaining four which carries the photocell arrangement for the particular category determined by the first screen. This system is believed so obvious as not to require any more detailed disclosure thereof.

The two photocells 13′ and 14′ are shaped and placed to sense the beginning or end of a letter; in other words, at least one of the two will "see" black while the letter is passing through and both will "see" white when they are in space between two letters. This fact is utilized to establish the precise position of the image of a letter relative to the photocells 1′ through 12′, when the letter is being read. In other words, while a letter is passing over the photocells 1′–12′ their resistance fluctuations have no effect and are neglected until a certain position of this letter relative to the photocells 13′ and 14′ is reached. Then the instantaneous state of the remaining photocells is utilized to recognize that letter. The details of this process were explained in previous discussion.

It is immaterial whether the photocells 13′ and 14′ sense the beginning or the end of a letter. In FIG. 1 they are arranged such that they sense the beginning, because in a position for sensing the end, photocell 14' would interfere with photocell 9'. One could also eliminate photocells 13' and 14' entirely from the screen that senses the letters and could put these two photocells on a separate screen which could receive a separate picture of the letters by the semi-transparent mirror technique referred to above. In the latter case, one would not only avoid interference with the locations of photocells that serve another purpose, but also the particular photocells which sense the beginning or end of a letter could be given more elaborate shapes and functions, such as the diagonally running photocell described above which senses the space between two words or sentences. The space sensing photocells could also be divided into two groups, one of which would just sense the existence of a gap between letters which would "cock" a circuit. The other group would then be used to sense an instant later the beginning or end of a letter at a location where letters are particularly well defined. This second group would then trigger the cocked circuit, resulting in a particularly precise location of the letter when the "snap shot" is being taken.

So far, it has been assumed that only one type print will have to be read by the machine. If it is intended to use the machine for more than one type print, this can be accomplished by interposing between the lens L and the screen S in FIG. 1, a "mask" consisting of two parallel plates having lucite light guides between them. By this well known method it will be possible to "translate" the pattern of characteristic locations within a given type print into the standard pattern chosen for the arrangement of the photocells 1' through 12'. One such mask will then be needed for each type print. In the case of a machine which reads small letters, capital letters, numerals and punctuations, one such mask would have to be interposed in front of each of the photocell arrangements employed. If the optical means to produce a multiplicity of images are suitably chosen, all those images could be made to lie in one plane which would permit the use of a single one-piece, however multiple, mask for all the images.

Referring to the instance where the cells 13' and 14' would be positioned to sense the end of a letter rather than the beginning in the example illustrated, the functions of the contacts 13 and 14 in the supply line to the resistors R would have to be exchanged, i.e. contact 13 would have to be a "make" contact and contact 14 a "break" contact, resulting in a short pulse in the supply line when relays XIII and XIV are energized at the end of a letter. Also, in this case, the locations of the photocells 1' through 12' on the screen would have to be arranged differently because now the end of the letter rather than its beginning becomes the frame of reference in taking the "snapshot."

The advantages of a reading machine in accordance with the invention is believed obvious from the described embodiment. It should also be clear that each of the scanner and transmitter portions of the machine system are not only distinctive therein but independently capable of use in signal transmitting systems, both audible and otherwise.

From the above description it will be apparent that there is thus provided a device of the character described possessing the particular features of advantage before enumerated as desirable but which obviously is susceptible of modification in its form, proportion, detail of construction and arrangement of parts without departing from the principles involved or sacrificing any of their advantages.

While in order to comply with the statute the invention has been described in language more or less specific as to structural features, it is to be understood that the invention is not limited to the specific features shown but that the means and construction herein disclosed comprises but one of several modes of putting the invention into effect and the invention is therefore claimed in any of its forms or modifications within the legitimate or valid scope of the appended claims.

Having thus described my invention, I claim:

1. Apparatus for use in signal transmitting equipment including a frame, a shaft mounted within said frame, a series of arms projected from said shaft within said frame, said arms being frictionally related to said shaft and having data recorded on a portion thereof, means operatively engaged to said arms to normally prevent their rotation with said shaft and selectively responsive to a signal corresponding to the data on a particular arm to release that arm for movement with said shaft and means along the path of movement of said arm operative as the arm moves to a position adjacent thereto to transmit the data recorded on said arm.

2. Apparatus for translating transmitted signals into sounds corresponding thereto comprising, a frame, a plurality of flexible arms movable in said frame each mounting a device containing a recorded sound representing a selective one of a plurality of signals which may be transmitted to said frame, said arms normally occupying a stored position in said frame, a retention device normally operative to retain said arms in a stored position within said frame, said retention device being responsive to receipt of a transmitted signal to release from said stored position the selective one of said arms mounting the recorded sound which represents the said signal, said frame having therein an output station, guide means in said frame defining a path of movement for each of said arms to and through said output station, means rendered operative on a release of one of said arms to move the latter to said output station, means at said output station to control the speed of said released arm as it moves therethrough, and a read out device energized by movement of said arm through said output station to read out the recorded sound which corresponds to the transmitted signal.

3. Signal translating apparatus as set forth in claim 2 characterized by said guide means being so formed to provide for a return of said released arm to its stored position in said frame.

4. Signal translating apparatus as set forth in claim 2 characterized by said moving means being arranged to move each of said arms to said output station at a generally uniform speed and said control means being arranged to reduce the speed of said released arms in movement through said output station so that on receipt of a series of signals the said means mounting the corresponding recorded sounds will be moved to and through said output station in direct sequence, the reduction in speed at said output station providing, in effect, a stacking of said released arms at said output station whereby the sounds thereon will be reproduced by said read out device with complete continuity.

5. A signal read out device including a frame, a shaft mounted in said frame, a series of arm units projected from said shaft within said frame, said units being frictionally related to said shaft and each having on a portion thereof a recorded sound, means to normally prevent rotation of said arm units with said shaft selectively responsive to a signal corresponding to the sound recorded on a particular arm unit to release that arm unit for movement with said shaft, means along the path of movement of said released arm unit rendered operative on said arm unit assuming a position adjacent thereto to transmit the sound recorded on said arm unit, and means providing that the sound transmission of signals as so provided will be at a rate which is independent of the speed at which the signals are received.

6. Apparatus for translating signals corresponding to printed characters, code or other indicia into sound comprising a receiver unit having spaced therein a receiving and an output station, a plurality of means stored in said receiver unit at said receiving station each having on a portion thereof a recorded sound corresponding to an anticipated signal and each being mechanically movable from the receiving to the output station, a single read out device at said output station, means responsive to receipt of said signals to mechanically move to said output station, in proper sequence, the stored means mounting the corresponding sounds and means controlling the speed of the mechanical movement of the means mounting the corresponding stored sounds from the receiving station to and through the output station providing that the sounds representing said signals will be read out by said read out device at a rate that a series of signals which have continuity in transmission will be read out in a synthesized form.

7. Apparatus for use in signal translating equipment including means defining a storage section having preselected mechanically movable data carrying elements stored therein, release means for said mechanically movable elements selectively responsive to signals corresponding to the data carried by said elements, means defining a single read out station, means for mechanically moving selectively released data carrying elements to said single read out station and back to said storage section and means at said read out station providing for a read out at a rate which is independent of the speed at which the data carrying elements are moved thereto.

References Cited by the Examiner

UNITED STATES PATENTS

| | | | |
|---|---|---|---|
| 2,228,782 | 1/41 | Sharples | 179—100.3 |
| 2,457,456 | 12/48 | Flory | 35—35 |
| 2,487,511 | 11/49 | Bedford | 35—35 |
| 2,518,694 | 8/50 | Jannopoulo | 179—1 |
| 2,595,701 | 5/52 | Potter | 179—1 |
| 2,771,509 | 11/56 | Dudley et al. | 179—1 |
| 2,832,841 | 4/58 | Eldridge | 179—100.2 |
| 2,866,279 | 12/58 | Surber | 35—35 |
| 2,880,279 | 3/59 | Nickerson | 179—100.2 |
| 2,992,408 | 7/61 | Eldridge et al. | 340—149 |
| 3,018,471 | 1/62 | Kamentsky | 340—149 |
| 3,029,414 | 4/62 | Schrimpf | 340—172.5 |

FOREIGN PATENTS

| | | |
|---|---|---|
| 506,782 | 12/54 | Italy. |

OTHER REFERENCES

Speech and Communication Problems, by F. Vilbig, Technology Review, vol. 54, No. 3, pp. 145 to 146, January 1952.

Letter Reading Machine, Electronics, June 1949, pp. 80–86.

ROBERT H. ROSE, *Primary Examiner.*

LEO SMILOW, L. MILLER ANDRUS, GEORGE A. NINAS, Jr., *Examiners.*